United States Patent
Ten Kroode et al.

(10) Patent No.: US 6,510,105 B1
(45) Date of Patent: Jan. 21, 2003

(54) OBTAINING AN IMAGE OF AN UNDERGROUND FORMATION

(75) Inventors: Alphonsus Paulus Eduard Ten Kroode, Rijswijk (NL); William Alexander Mulder, Rijswijk (NL); Pleun Marinus Van Der Sman, Rijswijk (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 09/500,491

(22) Filed: Feb. 9, 2000

(30) Foreign Application Priority Data

Oct. 14, 1999 (EP) .............................................. 99308119

(51) Int. Cl.⁷ ................................................. F21B 7/00
(52) U.S. Cl. ........................................ 367/68; 175/45
(58) Field of Search .............................. 367/68, 73, 25; 175/45, 26; 702/14, 16

(56) References Cited

U.S. PATENT DOCUMENTS

| | | | |
|---|---|---|---|
| 5,081,611 A | 1/1992 | Hornby | 367/25 |
| 5,170,377 A | 12/1992 | Manzur et al. | 367/73 |
| 5,230,387 A * | 7/1993 | Waters et al. | 170/45 |
| 5,300,929 A | 4/1994 | Macleod | 340/853.8 |

FOREIGN PATENT DOCUMENTS

| | | | | |
|---|---|---|---|---|
| WO | 99/19749 | | 4/1999 | G01V/1/00 |
| WO | WO 01/27657 A1 * | | 4/2001 | G01V/1/50 |

OTHER PUBLICATIONS

C. Macbeth and S. Crampin, *Comparison of Signal Processing Techniques for Estimating the Effects of Anisotropy, Geophysical Prospecting*, 39, 1991, pps 357–385.

* cited by examiner

*Primary Examiner*—Edward Lefkowitz
*Assistant Examiner*—Victor J. Taylor

(57) ABSTRACT

A method for creating an image of an underground formation around a borehole. An omnidirectional seismic source is activated in the borehole and a three-component receiver records the components of the reflected energy from the formation. The direction or ray of the returned energy is computed as a function of the two-way travel time A position in the formation is selected as a potential formation reflection point compared with the directional ray and two-way travel time. Where the directional ray and two-way travel time substantially correspond to the selected point, the data is attributed to the selected point The process continues with the selection of additional points and calculation of attributed return energy direction and two-way travel time to such points to comprise a set of reflectors which form the image of the formation.

8 Claims, 2 Drawing Sheets

OBTAINING AN IMAGE OF AN UNDERGROUND FORMATION

FIELD OF THE INVENTION

The present invention relates to a method of obtaining an image of an underground formation around a borehole extending through the underground formation. The image that is to be obtained comprises a set of reflectors attributed to underground positions in the underground formation around the borehole. Such an image is produced to provide detailed information of the underground formation while drilling the borehole. This information allows planning the direction into which the borehole is drilled. This is particularly useful when it is required that a horizontal borehole that is being drilled is kept within a thin formation layer.

SUMMARY OF THE INVENTION

The method and apparatus of the present invention calls for the activation of a tool having an omnidirectional low frequency source in the well borehole. The energy travels into the formation and is reflected back towards the tool where it is detected by a three component receiver. The return signal is then recorded for further processing. The return data may be processed to determine ray direction and two-way travel times for the return data utilizing known techniques. A point is then selected in the formation. These points may be selected based on prior seismic data or core sampling with respect to velocity times in the formation. Accordingly, the present method utilizes some a priori knowledge with respect to expected return times for the formation. For the selected point, a hypothetical or projected ray direction and travel times are calculated using the same techniques The projected ray and travel times are compared with a calculated ray/travel time. If the parameters are sufficiently similar, the data is attributed to the point. If the calculated and projected ray and travel times are not sufficiently similar, a new point in the formation is selected, projected ray and travel times computed and are once again matched against calculated data. This process is repeated until all calculated ray and travel times have been attributed to various point reflectors in the formation. Using this information, an image of the formation may be created using the various point reflectors.

In the specification and in the claims the term 'two-way travel time' is used to refer to the time it takes for seismic energy to go from a source via a reflector to a receiver.

It will be understood that in order to perform the calculations in step (e), it is required to know the seismic velocities in the formation. These seismic velocities can be obtained from previous seismic work done in relation to the formation, or they can be obtained from core samples. In addition, sonic measurements can provide information on the seismic velocities.

DETAILED DESCRIPTION OF THE PREFERRED EMBODIMENT

Figure 1:
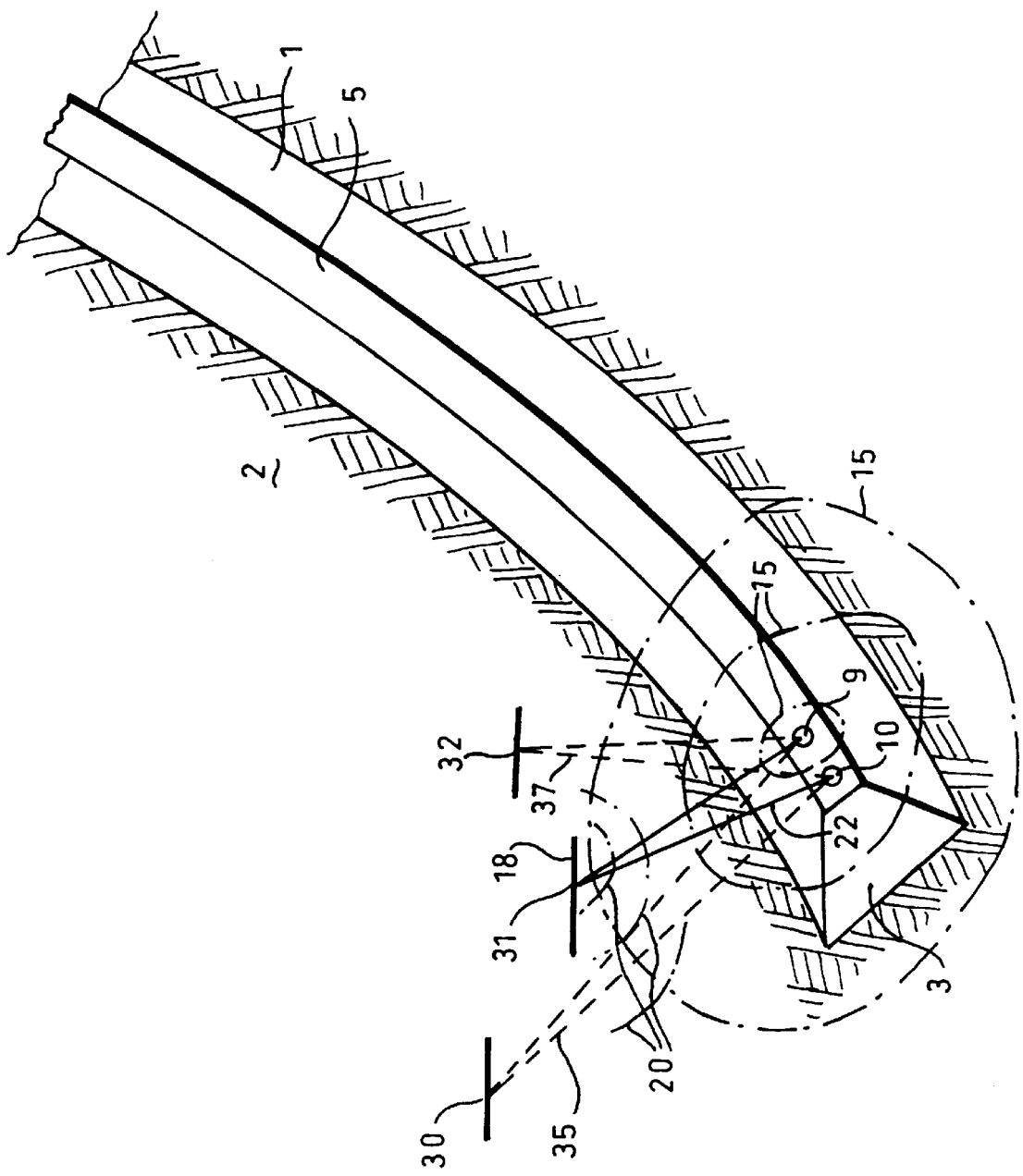
FIG. 1 is a depiction of the method the present invention being carried out in a borehole surrounded by an earth formation.

FIG. 1 depicts a borehole 1 that is being drilled in an underground formation 2. In this example the borehole 1 is drilled by means of a drill bit 3 suspended in the borehole by means of a drill string assembly 5, which drill string assembly 5 is rotated.

Near the drill bit 3, the drill string assembly 5 comprises an omnidirectional source 9 and a downhole three-component receiver 10.

During normal operation, the drill bit 3 is used to drill the borehole 1, and in order to obtain the image, drilling is interrupted, and the omnidirectional source 9 is activated. Seismic energy emitted by the omnidirectional source 9 spreads out into the formation 2, and the wave fronts pertaining to the reflected seismic energy at different moments in time are schematically shown by the dashed lines 15.

Assume that a reflector 18 is present in the underground formation 2, which reflector 18 reflects the seismic energy. The wave fronts pertaining to the reflected seismic energy at different moments in time are schematically shown by the dashed lines 20. Line 22 represents a ray extending from the omnidirectional source 9 to the reflector 18 and back to the three-component receiver 10.

The data received by the three-component receiver 10 includes the components of the reflected seismic energy in time. From this data the directions from which the seismic energy arrives can be determined as a function of the two-way travel time.

Next a number of underground positions 30, 31 and 32 is selected in the formation, and a first one is chosen, let us assume that it is underground position 30. Knowing the seismic velocities in the underground formation, the arrival direction of the ray extending from the omnidirectional source 9 to the reflector at position 30 and back to the three-component receiver 10 is calculated as well as the two-way travel time of seismic energy passing along the ray. This ray is shown by dashed line 35.

The data is accepted if the calculated arrival direction is substantially equal to an arrival direction that has the same two-way travel time. In this example, this is clearly not the case, so that the data is not accepted.

Then a next underground position 31 is selected. Next, the arrival direction of the ray extending from the omnidirectional source 9 to the reflector at position 31 and back to the three-component receiver 10 is calculated as well as the two-way travel time of seismic energy passing along the ray. This ray coincides with line 22. In this case the calculated arrival direction is substantially equal to the arrival direction of the reflection from the reflector 18, and the ray that coincides with line 22 has the same two-way travel time. Thus, the data is accepted and the data is mapped on the underground position 31.

Then the third underground position 32 is selected. The calculated arrival direction of the ray extending from the omnidirectional source 9 to the reflector at position 32 and back to the three-component receiver 10 shown as dashed line 37 is not substantially equal to the arrival direction of the reflection from the reflector 18. Thus, the data is not accepted.

Having treated the three underground positions 30, 31 and 32, an image of the underground formation 2 is obtained, which image comprises a reflector attributed to underground position 31 and no reflectors attributed to underground positions 30 and 32.

Drilling is resumed, and after some distance has been drilled, the above-described procedure is repeated, and so on.

In this way an accurate image of the underground formation near the drill bit can be obtained, in particular when more than three underground positions are selected for each position along the borehole.

In case there are more reflectors than the reflector 18 shown in the Figure, rays from these reflectors (not shown) will be received at different moments in time.

Determining from the components of the reflected seismic energy the directions from which the reflected seismic energy arrives at the three-component receiver as a function of two-way travel time is known, it can for example be done with techniques outlined in the article Comparison of Signal Processing Techniques For Estimating The Effects of Anisotropy, C. Macbeth and S. Crampin, *Geophysical Prospecting*, 39, 1991, pps. 357–385.

Both the arrival direction of a ray extending from the omnidirectional source to the reflector and back to the three-component receiver and two-way travel time of seismic energy passing along the ray are calculated using a migration technique. Such migration techniques are known in the art.

The data is accepted if the calculated arrival direction is substantially equal to an arrival direction that has the same two-way travel time. To do so, suitably, the difference between the calculated arrival direction and the arrival direction pertaining to reflected seismic energy having the same two-way travel time is determined. Then a weight factor is determined using a predetermined function of this difference. The data are multiplied with the weight factor, and the weighted data are mapped on the underground position. The weight function is for example a rectangular window function. The window function or box function is a function of the difference, such that the window function equals 1 if the absolute value of the difference is less than predetermined value and that it equals 0 everywhere else. Consequently, for a large difference the weight factor is 0 and the weighted data is 0 so that no data are mapped, and for a relatively small difference the weight factor is 1 so that the data are mapped. An alternative weight function is a cosine squared.

Suitably, the data that is mapped on the underground position is the magnitude of the reflected seismic energy. The magnitude of the reflected seismic energy is then determined with the migration technique. Alternatively, the reflectivity can be determined from the data by comparing the reflected seismic energy with the emitted seismic energy and making a correction for the geometrical spreading.

Although it is possible to apply the migration technique for any position of the omnidirectional source relative to the three-component receiver, it is preferred that the omnidirectional source and the three-component receiver are coincident. In the specification and in the claims the word 'coincident' is used as follows. Two devices are said to be coincident when they are as close as to each other as is technically feasible, in which case they can be considered as one for calculation purposes. In that case the reflectivity can be calculated using a zero-offset migration algorithm.

In order to distinguish the arrival of shear waves (or s waves) from the arrival of faster compression wave (or p waves), a sensor, such as a hydrophone or an accelerometer can be included in the three-component receiver.

The reflected seismic energy can be passed to surface by known means of transferring data, so that the analysis part of the method is done at surface. Alternatively, the directions form which the reflected seismic energy arrives at the three-component receiver as a function of two-way travel time are determined in-situ, and the results are transferred to surface where the analysis takes place.

Instead of using an omnidirectional separate source, the drill bit itself can be used as a source, and in that case the seismic energy is noise generated while drilling.

Figure 2:
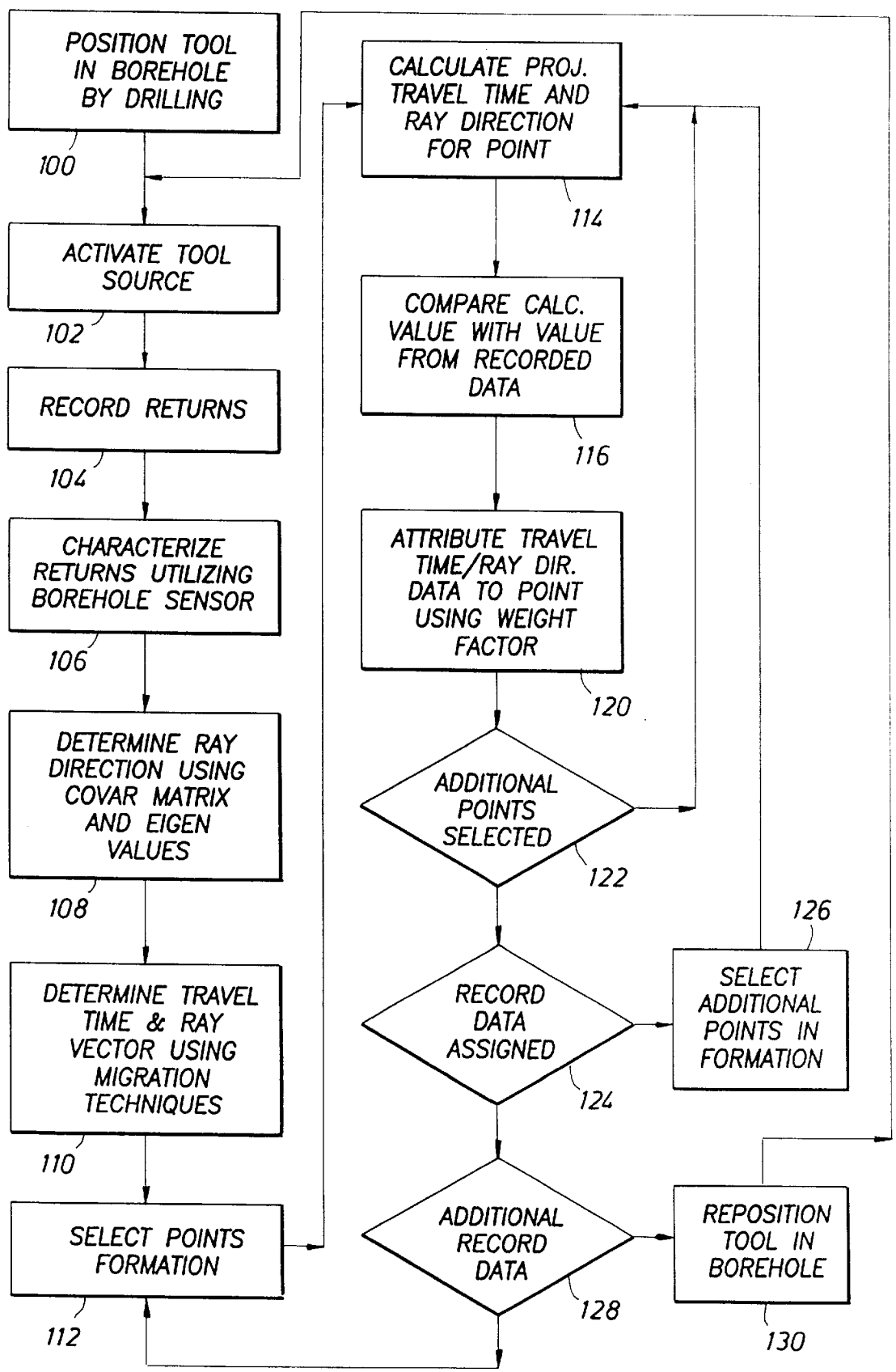
FIG. 2 is a flow chart depicting the method of the present invention.

FIG. 2 is a flow diagram of the method of the present invention. In step 100, the tool as generally described in FIG. 1 is positioned in the borehole during drilling operations. In step 102, drilling operations are suspended and the omnidirectional source is activated. It will be appreciated that, instead of a separate source, the drill bit itself may be used as a seismic source. It may be moved up and down -within the borehole to create a seismic impulse. Alternatively, drilling operations may be continued and the noise created by the drill bit can act as the source. In step 104, the three-component receiver is used to detect the energy returns and the returns are recorded in memory storage.

The returns can be characterized through the use of an accelerometer, hydrophone or pressure sensor to distinguish shear waves from compression waves in step 106. It will be appreciated that the use of a hydrophone or accelerometer or other sensor is not required within the method of the present invention. Based on the returns, the two-way travel time and ray directions for the source activation may be determined from the various returns in step 108. One technique that may be utilized is the covariance matrix approach disclosed in the MacBeth and Crampin article. According to this method, the eigenvector of a covariance matrix is analyzed. The relative magnitudes of the eigenvalues reveal the nature of the average particle motion, which reflects the relative sizes of the axes of an average particle motion ellipsoid. The eigenvector is providing the required information about the direction from which the seismic energy comes. See, MacBeth and Crampin, pp. 372–75. The travel time and ray vectors may then be determined utilizing various known migration techniques in step 110.

A point in the formation offset from the tool as a potential reflector is selected in step 111. The travel time and ray directions for the projected point reflector are calculated in step 114 and compared with actual ray and travel times in step. 116. If it is determined that the projected ray and travel times for the point do not substantially correspond with any of the rays and travel times calculated in steps 108 and 110, a weighting factor is used to assign the recorded-based data to that point in step 120. A simple weighting factor would be a windowing factor in which a "0" or "1" is assigned to the point based on the difference in the actual travel time/ray and the calculated travel time ray. As mentioned herein, alternative factors, such as a cosine squared factor may be used to assign data to the point in consideration as opposed to a off/on of 0/1. The data that is mapped is the magnitude of the reflected seismic energy for the point modified by the weighting factor.

It is determined whether additional points have been selected for the set of recorded data in step 122. If additional points have been selected, the process returns back to step 114 in which the projected travel time and ray direction for the point are determined. If there are no additional selected points in step 122, the process moves to step 124 in which it is determined whether the recorded data has been assigned. If not, control proceeds to step 126 in which additional points are selected and the process returns to step 114. If the recorded data has bee assigned, control proceeds to step 128, in which it is determined whether there is additional corded data associated with the pulse. If there is additional data, control proceeds to step 112 in which points in the formation are selected for the data. If not, the tool is repositioned in the borehole 130 and control passes to step 100.

The present invention provides a simple method for obtaining an image from an underground formation in the neighborhood of a borehole that is being drilled.

What is claimed is:

1. A method of obtaining an image of an underground formation around a borehole extending through the underground formation, which method comprises the steps of:

(a) arranging an omnidirectional source and a three-component receiver in a first position in the borehole;

(b) activating the omnidirectional source to generate seismic energy and recording with the three-component receiver data in the form of the components of the reflected seismic energy with the three-component receiver;

(c) determining from the components of the reflected seismic energy the directions from which the reflected seismic energy arrives at the three-component receiver as a function of two-way travel time;

(d) selecting a number of underground positions in the formation;

(e) selecting a first underground position;

(f) calculating the arrival direction of a ray extending from the omnidirectional source to the underground position and back to the three-component receiver and two-way travel time of seismic energy passing along the ray;

(g) accepting the data if the calculated arrival direction is substantially equal to an arrival direction as obtained in step (c) pertaining to reflected seismic energy having the same two-way travel time, and mapping the accepted data on the underground position; and (h) selecting a next underground position and repeating steps (f) and (g) until the last underground position to obtain the image of the underground formation comprising a set of data mapped on underground positions.

2. The method according to claim 1, wherein step (g) comprises determining the difference between the calculated arrival direction and the arrival direction as obtained in step (c) pertaining to reflected seismic energy having the same two-way travel time, multiplying the data with a weight factor which is a predetermined function of this difference, and mapping the weighted data on the underground position.

3. The method according to claim 2, wherein the data used in step (g) is the sum of the components of the reflected seismic energy recorded in step (b).

4. The method according to claim 2, wherein the data used in step (g) is the reflectivity determined from the reflected seismic energy recorded in step (b).

5. The method according to claim 1 wherein the ids omnidirectional source and the three-component receiver are coincident.

6. The method according to claim 4, wherein the omnidirectional source and the three-component receiver are coincident, and wherein the reflectivity is calculated using a zero-offset migration algorithm.

7. The method according to claim 1, wherein the three-component receiver further includes a pressure sensor.

8. The method according to claim 7, further comprising arranging the omnidirectional source and the three-component receiver in a second position in the borehole, and repeating the steps (b) through (h).

* * * * *